Nov. 13, 1928.  
I. LANGMUIR  
1,691,395

CIRCUIT CONTROL APPARATUS

Filed Aug. 16, 1926    2 Sheets-Sheet 1

Inventor:  
Irving Langmuir,  
by *[signature]*  
His Attorney.

Nov. 13, 1928.

I. LANGMUIR 1,691,395

CIRCUIT CONTROL APPARATUS

Filed Aug. 16, 1926

2 Sheets-Sheet 2

Inventor:
Irving Langmuir,
by *[signature]*
His Attorney.

Patented Nov. 13, 1928.

1,691,395

UNITED STATES PATENT OFFICE.

IRVING LANGMUIR, OF SCHENECTADY, NEW YORK, ASSIGNOR TO GENERAL ELECTRIC COMPANY, A CORPORATION OF NEW YORK.

CIRCUIT-CONTROL APPARATUS.

Application filed August 16, 1926. Serial No. 129,380.

My invention relates to apparatus for controlling the connections of electrical circuits, and has for its principal object the provision of an improved circuit control apparatus which comprises both a vapor electric device connected in the circuit to be controlled and means operable to extinguish the arc between the cathode and anode of this device very quickly either in response to manual control or in response to a predetermined electrical condition of the circuit.

In a copending application for Letters Patent, Serial No. 102,597 filed April 16, 1926, and assigned to the same assignee as the present application, I have disclosed a circuit control apparatus wherein the grid or control electrode potential of an electrical valve is maintained at a negative potential of sufficient magnitude to prevent the starting of current through the valve when it is deionized and wherein means are provided for neutralizing the potential between valve cathode and anode long enough to permit deionization of the valve and interruption of the anode current. My present invention is in some respects similar to that disclosed by the aforesaid application, but differs therefrom in that a valve provided with a vaporizable cathode of mercury or the like is associated with means for neutralizing the potential between its cathode and anode long enough to extinguish the cathode spot.

My invention will be better understood from the following description when considered in connection with the accompanying drawing and its scope will be pointed out in the appended claims.

Figure 1:
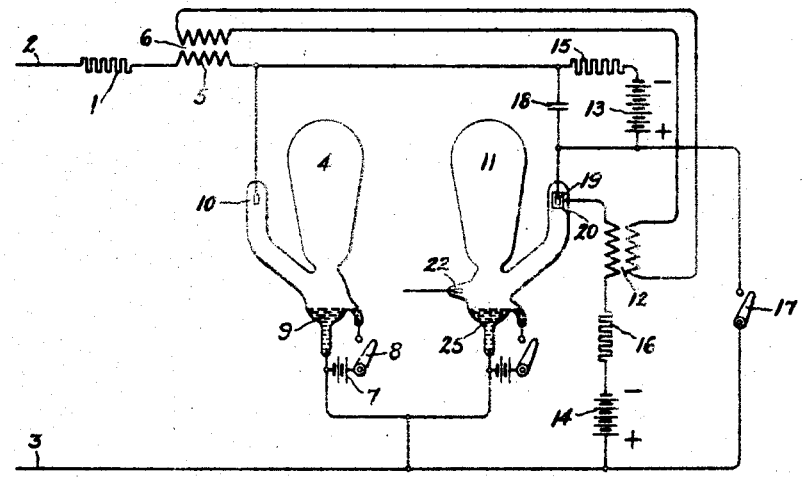
Figure 2:
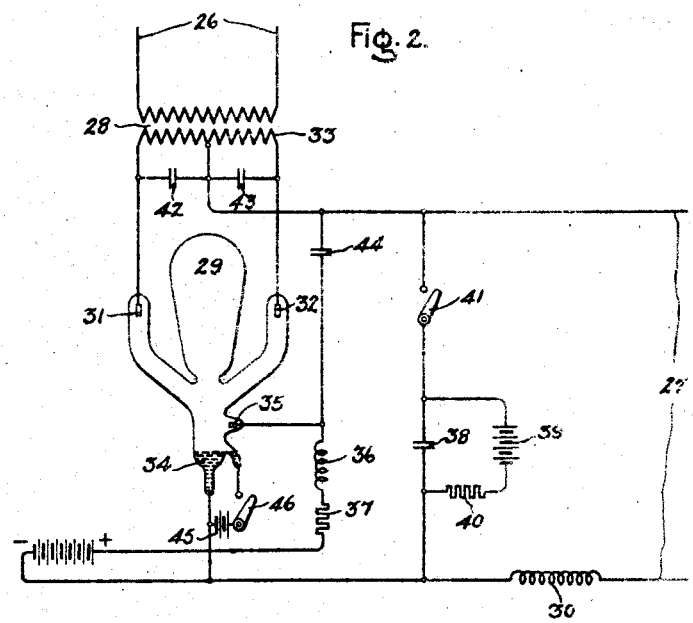
Figure 3:
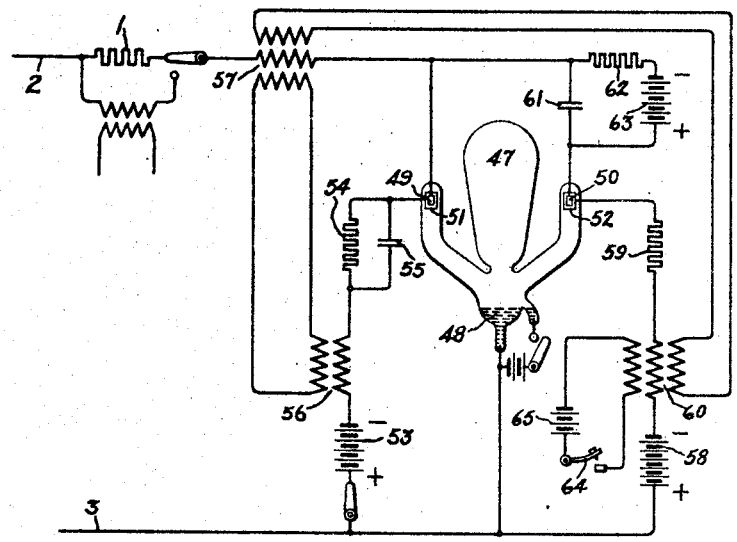

Referring to the drawings, Fig. 1 shows an apparatus for controlling the connections of a direct current circuit; Fig. 2 shows an apparatus for controlling the connections between direct and alternating current circuits; and Fig. 3 shows a modified form of apparatus for controlling the connections of a direct current circuit.

Fig. 1 shows a consumption device 1 to which current is supplied from a suitable source through direct current terminals 2 and 3, a vapor electric device 4 and the primary circuit 5 of a current transformer 6. Means shown as a source 7 and a switch 8 are provided for causing an arc to be started between a vaporizable cathode 9 and an anode 10 of the device 4. The cathode 9 may consist of any suitable material or mixture of materials which facilitates rapid deionization of the device 4. I have found that mercury containing a small percentage of aluminum meets these requirements.

An apparatus comprising a vapor electric device 11, transformers 6 and 12, sources 13 and 14, resistors 15 and 16, a switch 17 and energy storage means shown as a condenser 18 is provided for interrupting the current of the device 4 either in response to change in the current of the device 1 or in response to closure of the switch 17. The device 11 is provided with a cathode 25 and an anode 19 and with a grid 20 for controlling the current between this cathode and anode. It will be observed that the grid 20 is connected to the cathode 25 through the source 14, the resistor 16 and a transformer 12; that the primary circuit of the transformer 12 is connected to the secondary circuit of the transformer 6; and that the anodes 10 and 19 are interconnected through parallel circuits, one of which comprises the condenser 18 and the other of which comprises the source 13 and resistor 15. An exciting electrode 22 connected to the cathode 25 through any suitable source of exciting current may be provided for maintaining the excitation of the device 11.

Assuming current to have been started through the device 10 and the various switches to be in their illustrated positions, current is supplied to the consumption device 1 and current is prevented from starting through the device 11 because of the negative potential applied to the grid 20 by the source 14. At the same time, the condenser 18 is maintained in a charged condition due to its connection with the source 13. Upon closure of the switch 17, however, the condenser 18 is permitted to discharge through the device 4, thereby producing between the anode 10 and the cathode 9 a transitory counter-voltage whereby the cathode spot of the device 4 is extinguished and the current of the consumption device 1 is interrupted. Likewise, upon an increase of the current of the device 1 a positive potential is applied to the grid 20 through the current transformers 6 and 12, the device 11 is opened, and the condenser 18 discharges through the devices 4 and 11, thereby applying between the anode 10 and the cathode 9 a transitory counter-voltage whereby the current of the consumption device is interrupted. The condenser 18 thus serves as a means for storing energy which is at all times available for interrupting the current of the load device. It will of course be understood that any suitable means other than that shown and described may be utilized to store and discharge the energy required to interrupt the circuit.

Fig. 2 illustrates the invention as applied to a system for transmitting current between direct and alternating current circuits. This system comprises alternating current terminals 26 which are interconnected with direct current terminals 27 through a transformer 28, a vapor electric device 29 and an impedance device 30. The device 29 is provided with anodes 31 and 32 which are connected to the end terminals of the secondary circuit 33 of the transformer 28, with a vaporizable cathode 34 connected to an intermediate terminal of the secondary circuit 33 through the impedance device 30 and the direct current circuit 27, and with an excitation anode 35 which may be connected to the cathode 34 through reactor 36, resistor 37, and a suitable source of exciting current. An energy storage element comprising a condenser 38 connected in parallel with a source 39 and a resistor 40 is arranged to have one of its terminals connected to the cathode 34 and the other of its terminals connected through the switch 41 and condensers 42, 43 and 44 respectively to the anodes 31, 32 and 35. The usual source 45 and switch 46 may be provided for starting the arc which is thereafter maintained by the exciting anode 35 when the switch 46 is operated at its illustrated open position.

Assuming the arc of the device 29 to have been started and the switches 41 and 46 to be in their illustrated positions current is transmitted between the circuits 26 and 27 in a manner readily understood without further explanation. In order to interrupt this current, the switch 41 is closed, thereby permitting the condenser 38 to discharge and produce between the cathode and the various anodes transitory counter voltages whereby the cathode spot is extinguished and the main and exciting circuits are interrupted.

The usefulness of an energy storage element for the purpose of producing a transitory counter-voltage whereby the cathode spot is extinguished and the current between the cathode and anode is interrupted is not limited to an apparatus of the type illustrated by Figs. 1 and 2, but may also be utilized in conjunction with a vapor electric device provided with a control electrode or grid.

Fig. 3 illustrates the consumption device 1 as connected to the direct current terminals 2 and 3 through a vapor electric device 47 provided with a vaporizable cathode 48, anodes 49 and 50 and grids 51 and 52. While the device 1 has been shown as a resistor, it will be apparent that current may be supplied to different types of devices, such as the primary circuit of a transformer through which an inductive kick is produced by intermittently interrupting the circuit through the device 47. As will hereinafter appear, the current of the device 1 is normally transmitted between the cathode 48 and the anode 49 and the anode 50 is provided for completing a path through which a transitory counter-voltage is applied between the cathode 48 and the anode 49. It will be observed that the grid 51 is connected to the cathode 48 through a source 53, an energy storage element comprising a resistor 54 and a condenser 55, and the secondary circuit of a transformer 56 which is energized through a current transformer 57 connected in circuit with the device 1; that the grid 52 is connected to the cathode 48 through a source 58, a resistor 59 and a transformer 60 which, like the transformer 56, is energized through the current transformer 57; and that the anodes 49 and 50 are interconnected through an energy storage element comprising a condenser 61 connected in parallel with a resistor 62 and source 63. For manual control of the circuit interrupting apparatus, a switch 64 is arranged to connect a source 65 to a secondary circuit of the transformer 60.

Assuming current to have been started between the cathode 48 and anode 49 in any suitable manner and the connections to be as illustrated, the condenser 61 is charged but the path through the anode 50 is closed due to the fact that grid 52 is maintained at a negative potential by the source 58. Closure of the switch 64, however, produces between the cathode 48 and the grid 52 a transitory voltage whereby the grid is charged to a positive potential long enough to permit the discharge of the energy stored in the condenser 61. Upon this discharge of energy, the cathode spot is extinguished and the current of the consumption device 1 is interrupted as previously set forth.

This current may also be interrupted in response to a sudden increase in the current of the device 1. The effect of such an increase in current upon the potential of the grid 52 is to release the stored energy of the condenser in the same manner that this energy is released by operation of the switch 64. At the same time a further effect tending to interrupt the current between the anode 49 and cathode 48 is produced by the grid 51 which is initially charged to a high positive potential but is immediately thereafter charged to a high negative potential both due to the negative charge produced at the upper terminal of the condenser 55 by electrons attracted to the grid during the instant that its potential is positive and to the decrease in the magnitude of the grid current transmitted through the resistor 54.

It has been found that the time required to extinguish the arc and interrupt the circuit in accordance with my invention is extremely short and that this time may be materially shortened by the use of a cathode consisting of a material or a mixture, such as mercury mixed with a small percentage of aluminum, which tends to fix the cathode spot. Thus it has been observed that, with a cathode of mercury, a current of three amperes may be interrupted in 5 micro seconds while a current of one-half ampere is interrupted in much shorter time if aluminum and mercury are mixed in the proportions of .008 gram aluminum to 170 grams of mercury. A further advantage of this method of interrupting the circuit is that is is effective over a very considerable range of vapor pressures and does not require that the vapor electric device be as highly evacuated as when a heated filament or mercury cathode is utilized and starting of the current is prevented by an electrostatic grid charged to a negative potential.

The embodiments of the invention illustrated and described herein have been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new, and desire to secure by Letters Patent of the United States, is:

1. A circuit control apparatus comprising an anode and a vaporizable cathode, an energy storage element, and a space discharge device comprising an electrode connected to said element and a grid connected to said cathode for controlling the transfer of energy from said element through said cathode and anode.

2. A circuit control apparatus comprising an anode and a vaporizable cathode, an energy storage element, control means arranged to respond to an electrical condition of said anode and cathode, and a space discharge device provided with an electrode connected to said anode through said element and with a grid connected to said cathode through said control means.

3. A circuit control apparatus comprising an anode and a vaporizable cathode, an energy storage element, control means arranged to respond to an electrical condition of said anode and cathode, a space discharge device provided with an electrode connected to said anode through said element and with a grid connected to said cathode through said control means, and means for biasing said grid to a negative potential.

4. A circuit control apparatus comprising an anode and a vaporizable cathode, an energy storage element, control means arranged to respond to an electrical condition of said anode and cathode, a space discharge device provided with an electrode connected to said anode through said element and with a grid connected to said cathode through said control means, and manual control means arranged to cause a positive potential to be applied to said grid.

5. A circuit control apparatus comprising an anode and a vaporizable cathode, an energy storage element, a resistor, control means arranged to respond to an electrical condition of said anode and cathode, and a space discharge device provided with an electrode connected to said anode through said element and with a grid connected to said cathode through said resistor and said control means.

6. An apparatus comprising an anode and a cathode, a grid for controlling the starting of current between said cathode and anode, an energy storage element, a space discharge device, an electrode connected to said anode through said element and a grid connected to said cathode for controlling the current between said electrode and cathode, and means operable to control the potentials of said grids in accordance with an electrical condition of said anode.

In witness whereof, I have hereunto set my hand this 12th day of August, 1926.

IRVING LANGMUIR.